United States Patent [19]
Abe et al.

[11] Patent Number: 5,962,599
[45] Date of Patent: Oct. 5, 1999

[54] MOLDING RESIN, COMPOSITION CONTAINING THE SAME, AND PROCESS FOR PRODUCING THEM

[75] Inventors: Shigehiko Abe; Hiroshi Furuta, both of Yokkaichi, Japan

[73] Assignee: Tosoh Corporation, Yamaguchi, Japan

[21] Appl. No.: 08/934,694

[22] Filed: Sep. 22, 1997

Related U.S. Application Data

[63] Continuation of application No. 08/686,039, Jul. 25, 1996, abandoned.

[30]   Foreign Application Priority Data

| | | | |
|---|---|---|---|
| Jul. 28, 1995 | [JP] | Japan | 7-193136 |
| Jul. 28, 1995 | [JP] | Japan | 7-193137 |

[51] Int. Cl.[6] ..................................... C08F 8/06
[52] U.S. Cl. .................................. 525/333.8; 526/348.2; 526/348.3; 526/348.4; 526/348.5; 526/348.6; 526/160; 526/943
[58] Field of Search .......................... 526/348.2, 348.3, 526/348.4, 348.5, 348.6, 348.7, 160, 943; 525/333.8

[56] References Cited

U.S. PATENT DOCUMENTS

| | | | |
|---|---|---|---|
| 4,897,452 | 1/1990 | Berrier et al. | 525/333.8 |
| 5,317,036 | 5/1994 | Brady, III et al. | 523/223 |
| 5,374,700 | 12/1994 | Tsutsui et al. | 526/348.3 |
| 5,459,217 | 10/1995 | Todo et al. | 526/348.1 |
| 5,525,689 | 6/1996 | Tsutsui et al. | 526/160 |
| 5,710,224 | 1/1998 | Alt et al. | 526/160 |

FOREIGN PATENT DOCUMENTS

| | | |
|---|---|---|
| 0 069 603 | 1/1983 | European Pat. Off. . |
| 0 079 687 | 5/1983 | European Pat. Off. . |
| 0 610 942 | 8/1994 | European Pat. Off. . |
| 0 653 445 | 5/1995 | European Pat. Off. . |
| 653445 | 5/1995 | European Pat. Off. . |
| 7-26077 | 1/1995 | Japan ............................. C08L 23/08 |
| WO 85/04664 | 10/1985 | WIPO . |
| WO 93/12151 | 6/1993 | WIPO . |

*Primary Examiner*—David W. Wu
*Attorney, Agent, or Firm*—Sughrue, Mion, Zinn, MacPeak & Seas, PLLC

[57]   ABSTRACT

A molding resin having improved processability is disclosed, comprising a copolymer of ethylene and an α-olefin having 3 to 12 carbon atoms and having the following properties (a) a weight average molecular weight Mw to number average molecular weight Mn ratio (Mw/Mn) of 3 or less as determined by gel permeation chromatography;

(b) a density of 0.850 to 0.980 $g/cm^3$;

(c) a melt flow rate of 0.5 to 5 g/10 min as measured at 190° C. under a load of 2,160 g according to JIS K7210, Condition 4;

(d) a slope S of storage modulus G' in a frequency region of from the frequency ($f_c$) at which storage modulus G' and loss modulus G" agree with each other to $f_c/10$, which is obtained from the frequency dependence of dynamic viscoelasticity, i.e., $\Delta\log G'/\Delta\log f$, of more than 0.70 and less than 0.90; and (e) an activation energy of flow ΔH of 35 kJ/mol or less as obtained at 160 to 220° C.

9 Claims, No Drawings

MOLDING RESIN, COMPOSITION CONTAINING THE SAME, AND PROCESS FOR PRODUCING THEM

This is a continuation of application Ser. No. 08/686,039 filed Jul. 25, 1996 now abandoned.

FIELD OF THE INVENTION

This invention relates to a linear ethylene-α-olefin copolymer resin which is excellent in processability and therefore applicable to various molding methods, particularly calendering, a resin composition containing the same, and processes for producing them.

BACKGROUND OF THE INVENTION

High pressure produced-low density polyethylene (LDPE) has excellent processability and is widely used as processed in the form of tubes, pipes, sheets and films. On the other hand, copolymers of ethylene and an α-olefin having 3 to 12 carbon atoms have a linear molecular structure and a density of 0.945 g/cm³ or less and are known as linear low density polyethylene (LLDPE), and are obtained by copolymerization in the presence of a Ziegler catalyst system comprising a solid catalyst component containing magnesium and titanium, and an organoaluminum compound or a catalyst system comprising an organic transition metal compound containing a cyclopentadienyl derivative, and a compound capable of reacting with the organic transition metal compound to form an ionic complex and/or an organometallic compound. Although such a linear low density ethylene-α-olefin copolymer is superior to high pressure produced-low density polyethylene (LDPE) in break strength, it has a higher melt shear viscosity and much poorer processability than LDPE, with the melt flow rate (hereinafter abbreviated as "MFR") being equal. Additionally, it has a very small elongational viscosity and a small melt tension. In order to overcome these problems, the copolymer has been used as a polyblend with LDPE, but the polyblend does not always exhibit a good balance between processability and physical properties, and blending incurs cost.

In order to solve the problems, it has been a practice widely followed to modify the copolymer by reaction with a radical generator, chiefly an organic peroxide, to improve melt tension. However, since the conventional linear low density ethylene-α-olefin copolymer has a distribution of degree of branching and also has a somewhat wide molecular weight distribution, if the reaction is carried out to such a degree as to attain sufficiently improved melt tension, gelation occurs frequently during processing to cause surface roughening, resulting in only a product of no practical use.

On the other hand, it is known that conventional polyolefin resins are markedly difficult to process by calendering because they are sticky to the calender roll. The sticking of the polyolefin to the roll is considered attributed to low molecular weight components contained in the resin. To prevent this, it has been proposed to add a metallic soap to an olefin resin as disclosed in JP-A-7-26077 (unexamined published Japanese patent application). However, addition of a metallic soap to a resin not only causes contamination of the roll more or less but is also unfavorable from the hygienic consideration.

SUMMARY OF THE INVENTION

One object of the present invention is to eliminate the above-mentioned disadvantages, and to provide a molding resin and a molding resin composition, which have an improved melt shear viscosity and an improved melt tension, and thereby exhibit improved processability and undergo no gelation during processing, and, when calendered, exhibit no stickiness to the calender roll.

Another object of the present invention is to provide a process for producing the molding resin and the molding resin composition, which achieves improvement in processability without causing gelation and without the aid of such an additive as a metallic soap.

As a result of extensive study, the inventors have found that the objects of the present invention are accomplished by reacting a linear ethylene-α-olefin copolymer having a specific molecular weight distribution and a specific composition distribution with a radical generator under controlled conditions so as not to cause gelation and also by adding an antioxidant to the resulting resin, and melt extruding and pelletizing the resin composition.

The present invention relates to a molding resin obtained by reacting (A) a linear ethylene-α-olefin copolymer comprising ethylene and an α-olefin having 3 to 12 carbon atoms and having a density of 0.850 to 0.980 g/cm³, a weight average molecular weight Mw to number average molecular weight Mn ratio (hereinafter referred to as "Mw/Mn") of 3 or less as determined by gel permeation chromatography (hereinafter abbreviated as "GPC"), and an MFR of 0.5 to 10 g/10 min as measured at 190° C. under a load of 2,160 g according to JIS K7210, Condition 4, with (B) a radical generator to modify (A) so as to have (i) a slope S of storage modulus G' in a frequency region of from the frequency ($f_c$) at which storage modulus G' and loss modulus G" agree with each other to $f_c/10$, which is obtained from the frequency dependence of dynamic viscoelasticity, i.e., Δlog G'/Δlog f, of more than 0.70 and less than 0.90 and (ii) an activation energy of flow ΔH (kJ/mol) of 35 kJ/mol or less as obtained at 160 to 220° C.

The present invention also relates to a resin composition comprising the molding resin and an antioxidant.

The present invention further relates to a process for preparing the molding resin and the resin composition.

DETAILED DESCRIPTION OF THE INVENTION

The linear ethylene-α-olefin copolymer used in the present invention is a copolymer comprising ethylene and an α-olefin having 3 to 12 carbon atoms, and having a density of 0.850 to 0.980 g/cm³, preferably 0.870 to 0.945 g/cm³, a weight average molecular weight Mw to number average molecular weight Mn ratio (Mw/Mn) of 3 or less as determined by GPC, and an MFR of 0.5 to 10 g/10 min, preferably 1 to 3 g/10 min, as measured at 190° C. under a load of 2,160 g according to JIS K7210, Condition 4.

The ratio Mw/Mn as referred to in the present invention is obtained from Mw and Mn measured by GPC using a gel permeation chromatograph 150C ALC/GPC manufactured by Waters, a column GMHHR-H(S) manufactured by Tosoh Corp., and 1,2,4-trichlorobenzene as a solvent. The volume of the effluent was corrected based on standard polystyrene produced by Tosoh Corp. according to a universal calibration method.

The linear ethylene-α-olefin copolymer having the above-specified properties can be prepared by copolymerizing ethylene and an α-olefin in the presence of a catalyst for olefin polymerization comprising, for example, (a) a transition metal compound, (b) an ionized compound and/or (c) an organoaluminum compound.

Specific but non-limiting examples of the transition metal compound as component (a) include bis(cyclopentadienyl)-titanium dichloride, bis(cyclopentadienyl)zirconium dichloride, bis(cyclopentadienyl)hafnium dichloride, bis(pentamethyl cyclopentadienyl)titanium dichloride, bis(pentamethyl cyclopentadienyl)zirconium dichloride, bis(pentamethyl cyclopentadienyl)hafnium dichloride, bis(indenyl)titanium dichloride, bis(indenyl)zirconium dichloride, bis(indenyl)-hafnium dichloride, methylenebis(cyclopentadienyl)titanium dichloride, methylenebis(cyclopentadienyl)zirconium dichloride, methylenebis(cyclopentadienyl)hafnium dichloride, ethylenebis-(tetrahydroindenyl)titanium dichloride, ethylenebis-(tetrahydroindenyl)zirconium dichloride, ethylenebis-(tetrahydroindenyl)hafnium dichloride, ethylenebis(2-methyl-1-indenyl)titanium dichloride, ethylenebis(2-methyl-1-indenyl)zirconium dichloride, ethylenebis(2-methyl-1-indenyl)hafnium dichloride, isopropylidene(cyclopentadienyl-9-fluorenyl)titanium dichloride, isopropylidene(cyclopentadienyl-9-fluorenyl)zirconium dichloride, isopropylidene-(cyclopentadienyl-9-fluorenyl)hafnium dichloride, isopropylidene(cyclopentadienyl-2,7-dimethyl-9-fluorenyl)-titanium dichloride, isopropylidene(cyclopentadienyl-2,7-dimethyl-9-fluorenyl)zirconium dichloride, isopropylidene-(cyclopentadienyl-2,7-dimethyl-9-fluorenyl)hafnium dichloride, diphenylmethylene(cyclopentadienyl-9-fluorenyl)titanium dichloride, diphenylmethylene(cyclopentadienyl-9-fluorenyl)-zirconium dichloride, diphenylmethylene(cyclopentadienyl-9-fluorenyl)hafnium dichloride, diphenylmethylene-(cyclopentadienyl-2,7-dimethyl-9-fluorenyl)titanium dichloride, diphenylmethylene(cyclopentadienyl-2,7-dimethyl-9-fluorenyl)-zirconium dichloride, diphenylmethylene(cyclopentadienyl-2,7-dimethyl-9-fluorenyl)hafnium dichloride, dimethylsilanediylbis-(cyclopentadienyl)titanium dichloride, dimethylsilanediylbis-(cyclopentadienyl) zirconium dichloride, dimethylsilanediylbis-(cyclopentadienyl) hafnium dichloride, dimethylsilanediylbis-(methylcyclopentadienyl)titanium dichloride, dimethylsilane-diylbis(methylcyclopentadienyl)zirconium dichloride, dimethylsilanediylbis(methylcyclopentadienyl) hafnium dichloride, dimethylsilanediyl(cyclopentadienyl-2,7-dimethyl-9-fluorenyl)titanium dichloride, dimethylsilanediyl-(cyclopentadienyl-2,7-dimethyl-9-fluorenyl)zirconium dichloride, dimethylsilanediyl(cyclopentadienyl-2,7-dirnethyl-9-fluorenyl)hafnium dichloride, dimethylsilanediylbis-(tetrahydroindenyl) titanium dichloride, dimethylsilanediylbis-(tetrahydroindenyl)zirconium dichloride, dimethylsilanediylbis-(tetrahydroindenyl)hafnium dichloride, diethylsilanediylbis(2-methylindenyl)titanium dichloride, diethylsilanediylbis(2-methylindenyl)zirconium dichloride, diethylsilanediylbis(2-methylindenyl)hafnium dichloride, diphenylsilanediylbis-(indenyl)titanium dichloride, diphenylsilanediylbis(indenyl)-zirconium dichloride, and diphenylsilanediylbis (indenyl)hafnium dichloride.

Specific but non-limiting examples of the ionized compound as component (b) include diethyloxonium tetrakis-(phenyl)borate, dimethyloxonium tetrakis(phenyl)borate, tetramethyleneoxonium tetrakis(phenyl)borate, hydronium tetrakis(phenyl)borate, N,N-dimethylanilinium tetrakis-(phenyl)borate, tri-n-butylammonium tetrakis(phenyl)borate, diethyloxonium tetrakis(phenyl)aluminate, dimethyloxonium tetrakis(phenyl)aluminate, tetramethyleneoxonium tetrakis(phenyl)aluminate, hydronium tetrakis(phenyl)aluminate, N,N-dimethylanilinium tetrakis(phenyl)aluminate, tri-n-butylammonium tetrakis(phenyl)aluminate, diethyloxonium tetrakis(pentafluorophenyl)borate, dimethyloxonium tetrakis(pentafluorophenyl)borate, tetramethyleneoxonium tetrakis(pentafluorophenyl)borate, hydronium tetrakis-(pentafluorophenyl)borate, N,N-dimethylanilinium tetrakis-(pentafluorophenyl)borate, tri-n-butylammonium tetrakis-(pentafluorophenyl)borate, diethyloxonium tetrakis-(pentafluorophenyl)aluminate, dimethyloxonium tetrakis-(pentafluorophenyl)aluminate, tetramethyleneoxonium tetrakis(pentafluorophenyl)aluminate, hydronium tetrakis-(pentafluorophenyl)aluminate, N,N-dimethylanilinium tetrakis(pentafluorophenyl)aluminate, tri-n-butylammonium tetrakis(pentafluorophenyl)aluminate; lithium salts, such as lithium tetrakis(phenyl)borate and lithium tetrakis(phenyl)-aluminate, or ether complexes thereof; ferrocenium salts, such as ferrocenium tetrakis(phenyl)borate and ferrocenium tetrakis-(phenyl)aluminate; silver salts, such as silver tetrakis-(phenyl)borate and silver tetrakis(pentafluorophenyl)aluminate; trityl tetrakis(phenyl)borate, trityl tetrakis(phenyl)-aluminate, tropylium tetrakis(phenyl) borate, tropylium tetrakis(phenyl)aluminate; lithium salts, such as lithium tetrakis(methylphenyl)borate and lithium tetrakis(methyl-phenyl)aluminate, or ether complexes thereof; ferrocenium salts, such as ferrocenium tetrakis(methylphenyl)borate and ferrocenium tetrakis(methylphenyl)aluminate; silver salts, such as silver tetrakis(methylphenyl)borate and silver tetrakis-(methylphenyl) aluminate; trityl tetrakis(methylphenyl)borate, trityl tetrakis(methylphenyl)aluminate, tropylium tetrakis-(methylphenyl)borate, tropylium tetrakis(methylphenyl)-aluminate; lithium salts, such as lithium tetrakis(dimethyl-phenyl)borate and lithium tetrakis(dimethylphenyl) aluminate, or ether complexes thereof; lithium salts, such as lithium tetrakis(trifluorophenyl)borate and lithium tetrakis-(trifluorophenyl)aluminate, or ether complexes thereof; ferrocenium salts, such as ferrocenium tetrakis-(trifluorophenyl)borate and ferrocenium tetrakis-(trifluorophenyl)aluminate; silver salts, such as silver tetrakis(trifluorophenyl)borate and silver tetrakis-(trifluorophenyl)aluminate; lithium salts, such as lithium tetrakis(pentafluorophenyl)borate and lithium tetrakis-(pentafluorophenyl)aluminate, or ether complexes thereof; ferrocenium salts, such as ferrocenium tetrakis-(penafluorophenyl)borate and ferrocenium tetrakis-(pentafluorophenyl)aluminate; silver salts, such as silver tetrakis(pentafluorophenyl)borate and silver tetrakis-(pentafluorophenyl)aluminate; triphenylborane, tris(3,4,5-trifluorophenyl)borane, phenylbis(pentafluorophenyl) borane, tris(2,3,5,6-tetrafluorophenyl)borane, tris(2,3,4,5-tetraphenylphenyl)borane, tris(pentafluorophenyl)borane, trimethylphenylborane, tris(trifluoromethylphenyl)borane, phenylbis(trifluoromethylphenyl)borane, tris(methyltetra-fluorophenyl)borane, tris(methyltetraphenylphenyl)borane, triphenyl aluminate, tris(3,4,5-trifluorophenyl) aluminate, phenylbis(pentafluorophenyl) aluminate, tris(2,3,5,6-tetrafluorophenyl) aluminate, and tris(2,3,4,5-tetraphenylphenyl) aluminate.

Specific but non-limiting examples of the organo-aluminum compound as component (c) include trimethylaluminum, triethylaluminum, triisopropylaluminum, tri-n-propylaluminum, triisobutylaluminum, tri-n-butylaluminum, triamylaluminum, tribenzylaluminum, dimethylaluminum ethoxide, diethylaluminum ethoxide, diisopropylaluminum ethoxide, di-n-propylaluminum ethoxide, diisobutylaluminum ethoxide, di-n-butylaluminum ethoxide, dimethylaluminum hydride, diethylaluminum hydride, diisopropylaluminum hydride, di-n-propylaluminum hydride, diisobutylaluminum hydride, and di-n-butylaluminum hydride, dibenzylaluminum hydride, methylaluminum diethoxide, ethylaluminum diethoxide, isopropylaluminum diethoxide, n-propylaluminum diethoxide, isobutylaluminum diethoxide, n-butylaluminum diethoxide, benzylaluminum diethoxide, methylaluminum dihydride, ethylaluminum dihydride, isopropylaluminum dihydride, n-propylaluminum dihydride, isobutylaluminum dihydride, n-butylaluminum dihydride, benzylaluminum dihydride, and aluminoxane.

The α-olefin having 3 to 12 carbon atoms includes propylene, 1-butene, 4-methyl-1-pentene, 3-methyl-1-butene, 1-pentene, 1-hexene, 1-heptene, 1-octene, 1-nonene, 1-decene, 1-undecene, and 1-dodecene. Those may be used alone or as mixtures thereof.

The copolymerization of ethylene and the α-olefin in the presence of the above-mentioned catalyst system can be carried out by solution polymerization, slurry polymerization, high-pressure polymerization, gas phase polymerization, bulk polymerization, and the like. The conditions of the polymerization are specifically described below.

Solution polymerization is preferably performed at a temperature of 120° C. or higher, taking it into consideration that the copolymer is in a solution state and in order to secure productivity. The polymerization temperature has no particular upper limit but is preferably up to 300° C. so as to suppress chain transfer reaction, which might cause reduction in molecular weight, and so as not to reduce the catalyst efficiency. The polymerization pressure is not particularly limited but is preferably atmospheric pressure or higher for securing productivity.

High pressure polymerization is preferably performed at a temperature of 120° C. or higher, taking it into consideration that the copolymer is in a solution state and in order to secure productivity. The polymerization temperature has no particular upper limit but is preferably up to 300° C. so as to suppress chain transfer reaction, which might cause reduction in molecular weight, and so as not to reduce the catalyst efficiency. While not limiting, the polymerization pressure is preferably 500 kgf/cm$^2$ or higher at which stable polymerization conditions for the high pressure process can be obtained.

Gas phase polymerization should be performed at 100° C. or lower. High temperatures are unfavorable taking the powdered state of the copolymer into consideration. While not limiting, the lower limit of the polymerization temperature is preferably 50° C. for securing productivity.

To the linear ethylene-α-olefin copolymer thus prepared by any of the above-mentioned processes, a radical generator is added. The radical generator decomposes and reacts with the copolymer to provide a modified resin.

The radical generator is generally used in an amount of about 10 to 500 ppm.

The radical generator which can be used in the present invention preferably includes organic peroxides, such as hydroperoxides, dialkyl peroxides, and peroxy esters. In particular, those which decompose to half in a 1 minute period at a decomposition temperature exceeding 90° C. are preferred.

Examples of suitable radical generators are dicumyl peroxide, t-butyl hydroperoxide, 1,3-bis(t-butylperoxyisopropyl)benzene, di-t-butyl peroxide, 2,5-di(t-butylperoxy)-hexane, t-butyl peroxybenzoate, 2,5-dimethyl-2,5-di(t-butylperoxy)hexyne-3, 2,5-dimethyl-2,5-di(t-butylperoxy)hexane, and di-t-butyl peroxyphthalate.

The reaction of the radical generator and the copolymer can be carried out in any method. For example:

1) After completion of the copolymerization, when the copolymer is pelletized by means of an extruder, the radical generator is simultaneously fed and reacted in melt extrusion.

2) Pellets of the copolymer are blended with a previously prepared master batch containing a large quantity of the radical generator and subjected to reactive extrusion.

The resulting molding resin is a copolymer comprising ethylene and an α-olefin having 3 to 12 carbon atoms and having the following characteristics (a) to (e):

(a) The weight average molecular weight Mw to number average molecular weight Mn ratio (Mw/Mn) as determined by GPC is 3 or less.
(b) The density ranges from 0.850 to 0.980 g/cm$^3$.
(c) The MFR, as measured at 190° C. under a load of 2160 g according to JIS K7210, Condition 4, is 0.5 to 5 g/10 min.
(d) The slope S of storage modulus G' in a frequency region of from the frequency ($f_c$) at which storage modulus G' and loss modulus G" agree with each other to $f_c/10$, which is obtained from the frequency dependence of dynamic viscoelasticity, i.e., Δlog G'/Δlog f, is more than 0.70 and less than 0.90.
(e) The activation energy of flow ΔH (kJ/mol) as obtained at 160 to 220° C. is 35 kJ/mol or less.

If the ratio Mw/Mn is more than 3, the resin exhibits increased stickiness to rolls due to a high proportion of low molecular weight components, making it difficult to process the same with calender rolls. If the MFR is less than 0.5 g/10 min, the resin has an increased viscosity, making it difficult to process the same with calender rolls. If the MFR exceeds 5 g/10 min, the resin has a reduced melt tension, making it difficult to take up the same.

If the slope S (Δlog G'/Δlog f) is 0.70 or less, gelation occurs, making the product useless. If it is 0.90 or more, the resin exhibits a greatly reduced melt viscosity, making it difficult to take up the same.

A linear polyethylene obtained using a conventional Ziegler catalyst has a wide molecular weight distribution, and branches are largely introduced into low molecular weight components. For this reason, radicals are first reacted with a low density region having large branches, resulting in less modification effect. If the amount of the linear polyethylene added is increased in order to exhibit sufficient effect, gelation occurs in the high molecular weight region. Therefore, the modification range at which gelation does not occur is very narrow. The linear polyethylene produced using a metallocene catalyst does not cause gelation if the slope S is more than 0.7 and less than 0.9.

If the activation energy of flow exceeds 35 kJ/mol, the melt viscosity of the resin has large temperature dependence so that the range of molding and processing temperature at which a product with satisfactory surface conditions can be obtained would be much narrowed.

In the present invention, an antioxidant is added to the resulting molding resin, and the mixture is melt-kneaded to obtain a resin composition of the invention.

Melt-kneading may be carried out in any method. For example:

1) An antioxidant is added to the molding resin by means of a kneading machine, such as an extruder, a Banbury mixer, a roll mill, etc.

2) The pellets of the molding resin are melt-kneaded with a previously prepared master batch containing a large quantity of an antioxidant.

The antioxidant which can be used in the present invention include phenol type antioxidants and phosphorus type antioxidants.

The phenol type antioxidants include inonophenol compounds, thiobisphenol compounds, and trisphenol compounds. Specific examples of the phenol type antioxidants are 2,4-bis(n-octylthio)-6-(4-hydroxy-3,5-di-t-butylanilino)-1,3,5-triazine (commercially available under the trade name of Irganox 565 from Ciba-Geigy (Japan) Ltd.), octadecyl 3-(3,5-di-t-butyl-4-hydroxyphenyl) propionate (commercially available under the trade name of Irganox 1076 from Ciba-Geigy (Japan) Ltd.), and 1,3,5-trimethyl-2,4,6-tris(3,5-di-t-butyl-4-hydroxybenzyl) isocyanurate (commercially available under the trade name of Irganox 3114 from Ciba-Geigy (Japan) Ltd.). These phenol type antioxidants may be used either individually or as a mixture thereof.

Specific examples of the phosphorus type antioxidants are tris(2,4-di-t-butylphenyl) phosphite (commercially available under the trade name of Irgaphos 168 from Ciba-Geigy (Japan) Ltd.), tetrakis(2,4-di-t-butylphenyl)-4,4'-biphenylene phosphonite (commercially available under the trade name of Irgaphos P-EPQ FF from Ciba-Geigy (Japan) Ltd.), and tris(nonylphenyl) phosphite (commercially available under the trade name of MARK 1178 from Asahi Denka K. K.). These phosphorus type antioxidants may also be used either individually or as a mixture thereof.

The antioxidant is used in an amount of 0.1 to 5 parts by weight, preferably 0.1 to 1 part by weight, per 100 parts by weight of the modified resin.

If desired, the molding resin composition of the present invention may contain other arbitrary components as far as the effects of the present invention are not impaired. Other usable components include ethylene copolymer rubbers, such as an ethylene-propylene copolymer rubber, an ethylene-propylene-diene copolymer rubber, and an ethylene-butene copolymer rubber; a styrene-butadiene rubber, a styrene-butadiene block copolymer or a hydrogenation product thereof, polyolefin resins, such as polypropylene and polyethylene; fillers, such as talc, calcium carbonate, clay, mica, barium sulfate, and magnesium hydroxide; flame retarders, blowing agents, and various pigments.

The molding resin composition according to the present invention can be molded into sheet or film for use as flooring, wall paper, a waterproof sheet, a surfacing material for decorative laminates, a masking film, and an interlayer of laminated glass, and the like.

According to the present invention, the take-up properties of a linear ethylene-α-olefin copolymer can be improved without being accompanied by gelation while retaining the excellent properties of the copolymer, such as roll release properties because of Mw/Mn being 3 or less. In particular, the present invention makes it possible to improve processability in calendering, in which the conventional linear ethylene-α-olefin copolymer has encountered difficulty, thereby contributing to improvement in productivity.

The present invention will now be described in greater detail with reference to the following Examples, but it should be understood that the invention is not deemed to be limited hereto. The storage modulus G', loss modulus G", activation energy of flow ΔH of the resin compositions prepared in the Examples and the Comparative Examples were measured according to the following methods.

1) Measurement of Dynamic Viscoelasticity:

Frequency dependence of dynamic viscoelasticity was measured over a frequency region of from 0.16 to 400 Hz at a temperature of 160° C., 190° C. or 220° C. by using a viscoelasticity measurement analyzer DVE-V4 (manufactured by Rheology K. K.), which is a measuring apparatus based on a non-resonant forced vibration method, and a slit type tool, and master curves of storage modulus G' and loss modulus G" were prepared taking 190° C. as a reference temperature. The strain was measured in a linear area of 1% or less. A storage modulus G' and a loss modulus G" were decided from these measurements.

2) Activation Energy of Flow:

The activation every was obtained from the temperature dependence curve of shift factor (aT) in a measuring temperature range of from 160 to 220° C.

REFERENCE EXAMPLE 1

Into a 1 l stainless steel-made reactor equipped with a stirrer were put 600 ml of an aliphatic hydrocarbon IP Solvent 1620 (produced by Idemitsu Petrochemical Co., Ltd.) and 100 ml of 1-hexene, and the temperature of the reactor was set at 140° C. Ethylene was fed to the reactor to a pressure of 20 kg/cm$^2$, and the stirrer was driven at 1500 rpm. Diphenylmethylene(cyclopentadienyl-9-fluorenyl) zirconium dichloride (0.25 μmol), 0.3 μmol of N,N-dimethylanilinium tetrakis(pentafluorophenyl)borate, and 62.5 μmol of triisopropylaluminum were put into the reactor. The polymerization temperature was set at 140° C. The reaction system was stirred for 10 minutes while maintaining the inner pressure at 20 kg/cm$^2$ by feeding ethylene to conduct copolymerization. The resulting polymer was dried at 100° C., for 10 hours to obtain 30 g of an ethylene-1-hexene copolymer having a density of 0.900 g/cm$^3$, an MFR of 2 g/10 min, and an Mw/Mn ratio of 1.8.

REFERENCE EXAMPLE 2

Copolymerization was carried out in the same manner as in Reference Example 1 except for changing the polymerization temperature to 170° C. The resulting polymer had a density of 0.900 g/cm$^3$, an MFR of 15 g/10 min, and an Mw/Mn ratio of 1.8.

REFERENCE EXAMPLE 3

Copolymerization was carried out in the same manner as in Reference Example 1 except for changing the polymerization temperature to 120° C. The resulting polymer had a density of 0.900 g/cm$^3$, an MFR of 1 g/10 min, and an Mw/Mn ratio of 1.8.

REFERENCE EXAMPLE 4

Copolymerization was carried out in the same manner as in Reference Example 1 except for changing the amount of 1-hexene to 20 ml. The resulting polymer had a density of 0.920 g/cm$^3$, an MFR of 2 g/10 min, and an Mw/Mn ratio of 1.8.

EXAMPLE 1

To the ethylene-1-hexene copolymer pellets obtained in Reference Example 1 was added 25 ppm of PERBUTYL P (trade name, a product of Nippon Oils and Fats Co., decomposition point providing a half-life period of 1 minute: 176° C.) as a radical generator, and the mixture was melt-kneaded at 240° C. and pelletized.

To the pellets were added 2,000 ppm of Irganox 1076 and 500 ppm of PEP-Q (trade name, a product of Japan Ciba Geigy) as antioxidants, and the mixture was melt-kneaded at 240° C. and pelletized. Physical properties of the resulting pellets are shown in Table 1 below.

A 150 g portion of the sample was calendered using a calender roll of 8 in. in diameter under conditions of a roll surface temperature of 150° C., a roll peripheral speed of 10 m/min (speed ratio=1:1.1), and a roll nip of 300 μm for 10 minutes, and the calendered sheet was taken off. The roll release properties, the surface properties, and take-up properties of the sheet were evaluated. The results are shown in Table 1.

The resulting sheet had a satisfactory texture, and no gelation was observed.

EXAMPLE 2

To the ethylene-1-hexene copolymer pellets obtained in Reference Example 1 was added 50 ppm of Perbutyl P as a radical generator (decomposition point providing a half-life period of 1 minute: 176° C.), and the mixture was melt-kneaded at 240° C. and pelletized.

To the pellets were added 2000 ppm of Irganox 1076 and 500 ppm of PEP-Q as antioxidants, and the mixture was melt-kneaded at 240° C. and pelletized. Physical properties of the resulting pellets are shown in Table 1 below.

The processability of the resulting molding resin composition in calendering was evaluated in the same manner as in Example 1. The calendered sheet had a satisfactory texture, and no gelation occurred.

COMPARATIVE EXAMPLE 1

To the ethylene-1-hexene copolymer pellets obtained in Reference Example 1 were added 100 ppm of Perbutyl P as a radical generator (decomposition point providing a half-life period of 1 minute: 176° C.), and the mixture was melt-kneaded at 246° C. and pelletized.

To the pellets were added 2000 ppm of Irganox 1076 and 500 ppm of PEP-Q as antioxidants, and the mixture was melt-kneaded at 240° C. and pelletized. Physical properties of the resulting pellets are shown in Table 1 below.

The processability of the resulting molding resin composition in calendering was evaluated in the same manner as in Example 1. The calendered sheet had a poor surface condition and stood no use.

COMPARATIVE EXAMPLE 2

To the ethylene-1-hexene copolymer pellets obtained in Reference Example 2 were added 50 ppm of Perbutyl P as a radical generator (decomposition point providing a half-life period of 1 minute: 176° C.), and the mixture was melt-kneaded at 240° C. and pelletized.

To the pellets were added 2000 ppm of Irganox 1076 and 500 ppm of PEP-Q as antioxidants, and the mixture was melt-kneaded at 240° C. and pelletized. Physical properties of the resulting pellets are shown in Table 1 below.

The processability of the resulting molding resin composition in calendering was evaluated in the same manner as in Example 1. The calendered sheet had a satisfactory texture, and no occurrence of gelation was observed, but the resin was difficult to process due to poor take-up properties.

COMPARATIVE EXAMPLE 3

The physical properties of the ethylene-1-hexene copolymer pellets obtained in Reference Example 3 are shown in Table 1 below.

To the pellets were added 2,000 ppm of Irganox 1076 and 500 ppm of PEP-Q as antioxidants, and the mixture was melt-kneaded at 240° C. and pelletized. Physical properties of the resulting pellets are shown in Table 1 below.

The processability of the resulting molding resin composition in calendering was evaluated in the same manner as in Example 1. The calendered sheet had a satisfactory texture, and no occurrence of gelation was observed, but the resin was difficult to process due to poor take-up properties.

COMPARATIVE EXAMPLE 4

Ethylene-1-hexene copolymer pellets which were obtained by using a Ziegler catalyst and had a density of 0.900 g/cm$^3$, an MFR of 2 g/10 min, and an Mw/Mn of 5 (Lumitack 22-1, produced by Tosoh Corp.) were reacted with a radical generator in the same manner as in Example 1.

To the resulting pellets were added 2,000 ppm of Irganox 1076 and 500 ppm of PEP-Q as antioxidants, and the mixture was melt-kneaded at 240° C. and pelletized. Physical properties of the pellets are shown in Table 1 below.

The processability of the resulting molding resin composition in calendering was evaluated in the same manner as in Example 1. Gelation occurred in many parts of the sheet, and the calendered sheet had a poor texture and poor take-up properties.

COMPARATIVE EXAMPLE 5

Ethylene-1-hexene copolymer pellets which were obtained by using a Ziegler catalyst and had a density of 0.900 g/cm$^3$, an MFR of 2 g/10 min, and an Mw/Mn of 5 (Lurnitack 22-1, produced by Tosoh Corp.) were reacted with a radical generator in the same manner as in Example 2.

To the resulting pellets were added 2,000 ppm of Irganox 1076 and 500 ppm of PEP-Q as antioxidants, and the mixture was melt-kneaded at 240° C. and pelletized. Physical properties of the pellets are shown in Table 1 below.

The processability of the resulting molding resin composition in calendering was evaluated in the same manner as in Example 1. Gelation occurred in many parts of the sheet, and the calendered sheet had a poor texture and poor take-up properties.

COMPARATIVE EXAMPLE 6

Ethylene-1-octene copolymer pellets having long-chain branches selectively introduced into the main chain thereof which was obtained by using a constrained geometry catalyst and had a density of 0.870 g/cm$^3$, an MFR of 1 g/10 min, and an Mw/Mn of 2 (Engage EG8100, produced by Dow Chemical Co., Ltd.) were calendered to evaluate processability in the same manner as in Example 1.

As a result, it was difficult to obtain a sheet with a satisfactory texture because the processing temperature range was narrow.

TABLE 1

|  | MFR (g/10 min) | | Slope S | Activation Energy (kJ/mol) | Surface Condition | Roll Release | Take-up Properties |
| --- | --- | --- | --- | --- | --- | --- | --- |
|  | Before Reaction | After Reaction |  |  |  |  |  |
| Example 1 | 2.0 | 1.5 | 0.85 | 31 | good | good | good |
| Example 2 | 2.0 | 1.2 | 0.82 | 32 | good | good | good |
| Comparative Example 1 | 2.0 | 0.7 | 0.69 | 35 | bad | good | good |
| Comparative Example 2 | 15.0 | 10.0 | 0.90 | 32 | good | good | bad |
| Comparative Example 3 | 1.0 | 1.0 | 0.95 | 26 | good | good | bad |
| Comparative Example 4 | 2.0 | 1.3 | 0.82 | 30 | bad | good | bad |
| Comparative Example 5 | 2.0 | 1.0 | 0.80 | 35 | bad | good | bad |
| Comparative Example 6 | 1.0 | 1.0 | 0.83 | 38 | bad | good | good |

EXAMPLE 3

To the ethylene-1-hexene copolymer pellets obtained in Reference Example 4 were added 25 ppm of Perbutyl P as a radical generator (decomposition point providing a half-life period of 1 minute: 176° C.), and the mixture was melt-kneaded at 240° C. and pelletized.

The resulting pellets were melt-kneaded in a sheet extruder having a screw diameter of 50 mm at a cylinder tip temperature of 220° C. and extruded through a T-die having a width of 300 mm and taken up at a processing speed of 2 m/min to obtain a sheet having a thickness of 200 $\mu$m. The neck-in was small, the resulting sheet had a satisfactory texture, and no gelation occurred.

EXAMPLE 4

To the ethylene-1-hexene copolymer pellets obtained in Reference Example 4 were added 50 ppm of Perbutyl P as a radical generator (decomposition point providing a half-life period of 1 minute: 176° C.), and the mixture was melt-kneaded at 240° C. and pelletized.

Processability of the resulting pellets was evaluated in the same manner as in Example 3. The neck-in was small, the resulting sheet had a satisfactory texture, and no gelation occurred.

While the invention has been described in detail and with reference to specific examples thereof, it will be apparent to one skilled in the art that various changes and modifications can be made therein without departing from the spirit and scope thereof.

What is claimed is:

1. A molding resin comprising a copolymer of ethylene and 1-hexene, said resin having the following properties:

(a) a weight avenge molecular weight Mw to number average molecuar weight Mn ratio (Mw/Mn) of 3 or less as determine by gel permeation chromatography;

(b) a density of 0.850 to 0.980 g/cm$^3$;

(c) a melt flow rate of 0.5 to 5 g/10 min as measured at 190° C. under a load of 2,160 g according to JIS K7210, Condition 4;

(d) a slope S of storage modulus G' in a frequency region of from the frequency ($f_c$) at which storage modulus G' and loss modulus G" agree with each other to $f_c/10$, which is obtained from the frequency dependence of dynamic viscoelasticity, i.e., $\Delta$log G'/$\Delta$log f, of more than 0.70 and less than 0.90; and (e) an activation energy of flow $\Delta$H of 35 kJ/mol or less as obtained at 160 to 220° C., wherein there has been added to said copolymer a radical generator which has decomposed to react with said copolymer.

2. The molding resin as claimed in claim 1, wherein said $\alpha$-olefin is at least one member selected from the group consisting of propylene, 1-butene, 4-methyl-1-pentene, 3-methyl-1-butene, 1-pentene, 1-hexene, 1-heptene, 1-octene, 1-nonene, 1-decene, 1-undecene and 1-dodecene.

3. The molding resin as claimed in claim 1, wherein the radical generator is an organic peroxide.

4. The molding resin as claimed in claim 1, wherein the organic peroxide decomposes to half its original amount in a one minute period at a decomposition temperature exceeding 90° C.

5. The molding resin as claimed in claim 1, wherein the radical generator is selected from the group consisting of dicumyl peroxide, t-butyl hydroperoxide, 1,3-bis(t-butylperoxy-isopropyl)benzene, di-t-butyl peroxide, 2,5-di(t-butylperoxy)-hexene, t-butyl peroxybenzoate, 2,5dimethyl-2,5di(t-butylperoxy)hexane, and di-t-buty peroxyphthalate.

6. A resin composition comprising a molding resin and an antioxidant, said molding resin comprising a copolymer of ethylene and 1-hexene and having the following properties:

(a) a weight average molecular weight Mw to number average molecular weight Mn ratio (Mw/Mn) of 3 or less as determined by gel permeation chromatography;

(b) a density of 0.850 to 0.980 g/cm$^3$;

(c) a melt flow rate of 0.5 to 5 g/10 min as measured at 190° C. under a load of 2,160 g according to JIS K7210, Condition 4;

(d) a slope S of storage modulus G' in a frequency region of from the frequency ($f_c$) at which storage modulus G' and loss modulus G" agree with each other to $f_c/10$, which is obtained from the frequency dependence of dynamic viscoelasticity, i.e., $\Delta$log G'/$\Delta$log f, of more than 0.70 and less than 0.90; and (e) an activation energy of flow $\Delta$H of 35 kJ/mol less than as obtained at 160 to 220° C., wherein there has been added to said copolymer a radical generator which has decomposed to react with said copolymer.

7. The resin composition as claimed in claim 6, wherein the radical generator is an organic peroxide.

8. The resin composition as claimed in claim 6, wherein the organic peroxide decomposes to half its original amount in a one minute period at a decomposition temperature exceeding 90° C.

9. The resin composition as claimed in claim 6, wherein the radical generator is selected from the group consisting of dicumyl peroxide, t-butyl hydroperoxide, 1,3-bis(t-butylperoxy-isopropyl)benzene, di-t-butyl peroxide, 2,5-di(t-butylperoxy)-hexene, t-butyl peroxybenzoate, 2,5-dimethyl-2,5-di(t-butylperoxy)hexyne-3,2,5dimethyl-2,5-di(t-butylperoxy)hexane, and di-t-butyl peroxyphthalate.

* * * * *